(12) United States Patent
Hauptmann et al.

(10) Patent No.: US 11,280,667 B2
(45) Date of Patent: Mar. 22, 2022

(54) TORSIONAL VIBRATION AMPLITUDE SENSOR AND MONITOR

(71) Applicant: LO-REZ Vibration Control Ltd., Vancouver (CA)

(72) Inventors: Edward Gerald Hauptmann, Vancouver (CA); Richard Andrew Hordyk, Vancouver (CA)

(73) Assignee: LO-REZ Vibration Control Ltd., Delta (CA)

( * ) Notice: Subject to any disclaimer, the term of this patent is extended or adjusted under 35 U.S.C. 154(b) by 251 days.

(21) Appl. No.: 16/687,496

(22) Filed: Nov. 18, 2019

(65) Prior Publication Data

US 2020/0158563 A1 May 21, 2020

Related U.S. Application Data

(60) Provisional application No. 62/917,105, filed on Nov. 17, 2018.

(51) Int. Cl.
*G01H 1/10* (2006.01)

(52) U.S. Cl.
CPC ..................... *G01H 1/10* (2013.01)

(58) Field of Classification Search
CPC ....................................................... G01H 1/10
USPC ........................................................ 73/650
See application file for complete search history.

(56) References Cited

U.S. PATENT DOCUMENTS

| 3,791,203 | A | * | 2/1974 | Rice | G01H 1/10 |
| | | | | | 73/650 |
| 4,240,296 | A | * | 12/1980 | Kolodziej | G01P 15/0888 |
| | | | | | 73/514.02 |
| 4,715,451 | A | * | 12/1987 | Bseisu | E21B 47/007 |
| | | | | | 175/40 |
| 4,965,774 | A | * | 10/1990 | Ng | G01V 1/42 |
| | | | | | 367/75 |
| 5,226,332 | A | * | 7/1993 | Wassell | E21B 47/00 |
| | | | | | 175/40 |
| 5,520,061 | A | * | 5/1996 | Thibault | G01H 1/003 |
| | | | | | 73/579 |
| 5,917,726 | A | * | 6/1999 | Pryor | G05B 19/41875 |
| | | | | | 700/95 |
| 6,751,281 | B2 | * | 6/2004 | Hikida | G21C 15/243 |
| | | | | | 376/372 |

(Continued)

*Primary Examiner* — David L Singer
(74) *Attorney, Agent, or Firm* — Oyen Wiggs Green & Mutala LLP

(57) ABSTRACT

A device is disclosed for measuring torsional vibrations superimposed on rotating equipment such as a shaft. The device may be fastened to a rotating shaft by a collar and includes a sensor array comprising two or more accelerometers measuring the radial acceleration of the sensor array and the tangential acceleration of the sensor array. The gravitational component of the accelerometer signals is identified either by isolation in one of the signals, or by comparing two or more signals. From the tangential and radial acceleration signals, a torsional vibration amplitude is calculated from the ratio of the tangential acceleration and the radial acceleration. The radial acceleration is further used to determine the average velocity of the sensor array. The tangential acceleration may further be integrated to obtain the angular velocity of the sensor array, or further integrated to obtain the angle rotated through.

24 Claims, 13 Drawing Sheets

LEGEND
12A, 12B SENSOR ARRAY
16 SUPPORT STRUCTURE
18A, 18B COLLAR PARTS
20 CONTACT LOCATION
25 BOLT HOLE
26 PROCESSOR
28 TRANSMITTER

(56) References Cited

U.S. PATENT DOCUMENTS

| | | | |
|---|---|---|---|
| 6,876,715 B2* | 4/2005 | Hikida | G01H 1/003 376/372 |
| 7,487,679 B2* | 2/2009 | Sirrine | G01H 1/003 702/39 |
| 2003/0010127 A1* | 1/2003 | Clymer | G01M 13/00 73/655 |
| 2011/0018526 A1 | 1/2011 | Windmueller et al. | |
| 2013/0305842 A1 | 11/2013 | Meuter | |
| 2015/0101865 A1* | 4/2015 | Mauldin | E21B 47/024 175/40 |
| 2016/0010494 A1* | 1/2016 | Erlund | F02C 9/28 60/773 |
| 2016/0094172 A1* | 3/2016 | Oesterheld | G01H 1/10 322/4 |
| 2017/0145853 A1* | 5/2017 | Hesler | G01M 13/02 |
| 2017/0160301 A1* | 6/2017 | Donolo | G01D 5/145 |
| 2017/0170773 A1* | 6/2017 | Donolo | H02P 29/66 |
| 2018/0076753 A1* | 3/2018 | Donolo | G01S 11/02 |
| 2018/0080840 A1 | 3/2018 | Gleeson | |
| 2018/0331602 A1* | 11/2018 | Donolo | H02K 11/24 |
| 2019/0284881 A1* | 9/2019 | Hohl | E21B 17/07 |
| 2019/0360320 A1* | 11/2019 | Hohl | E21B 21/08 |
| 2020/0011751 A1* | 1/2020 | Kazemi Miraki | G01P 15/18 |

* cited by examiner

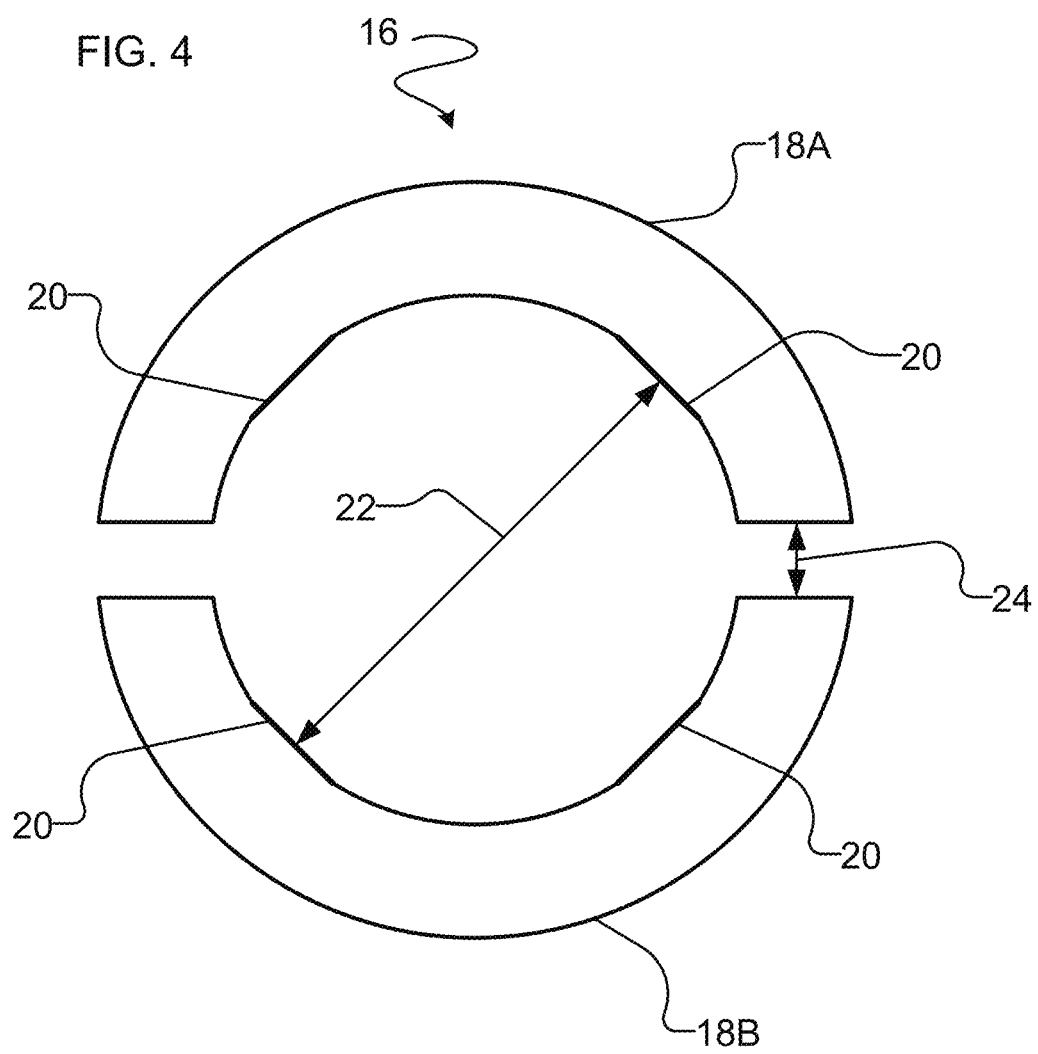

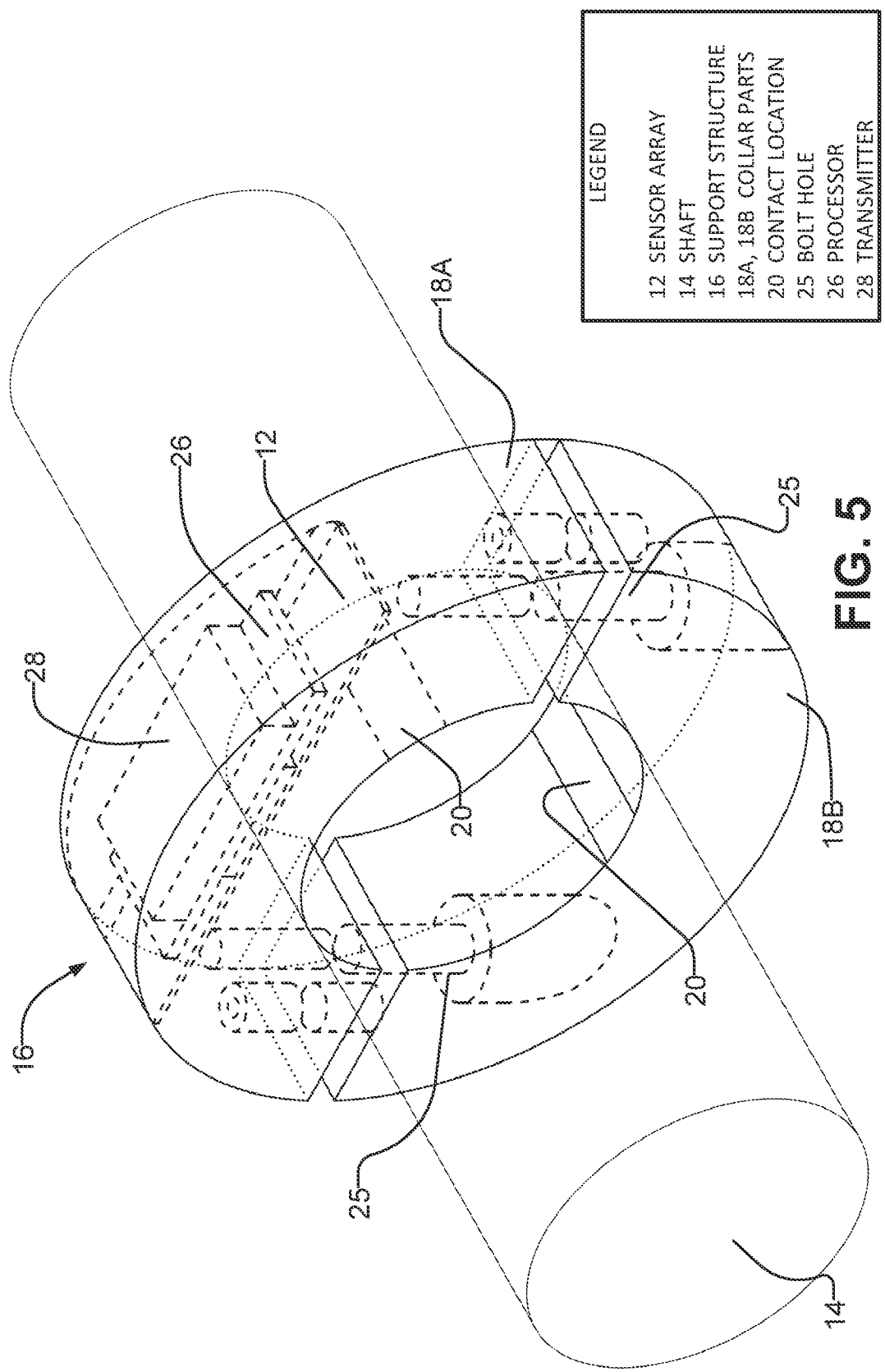

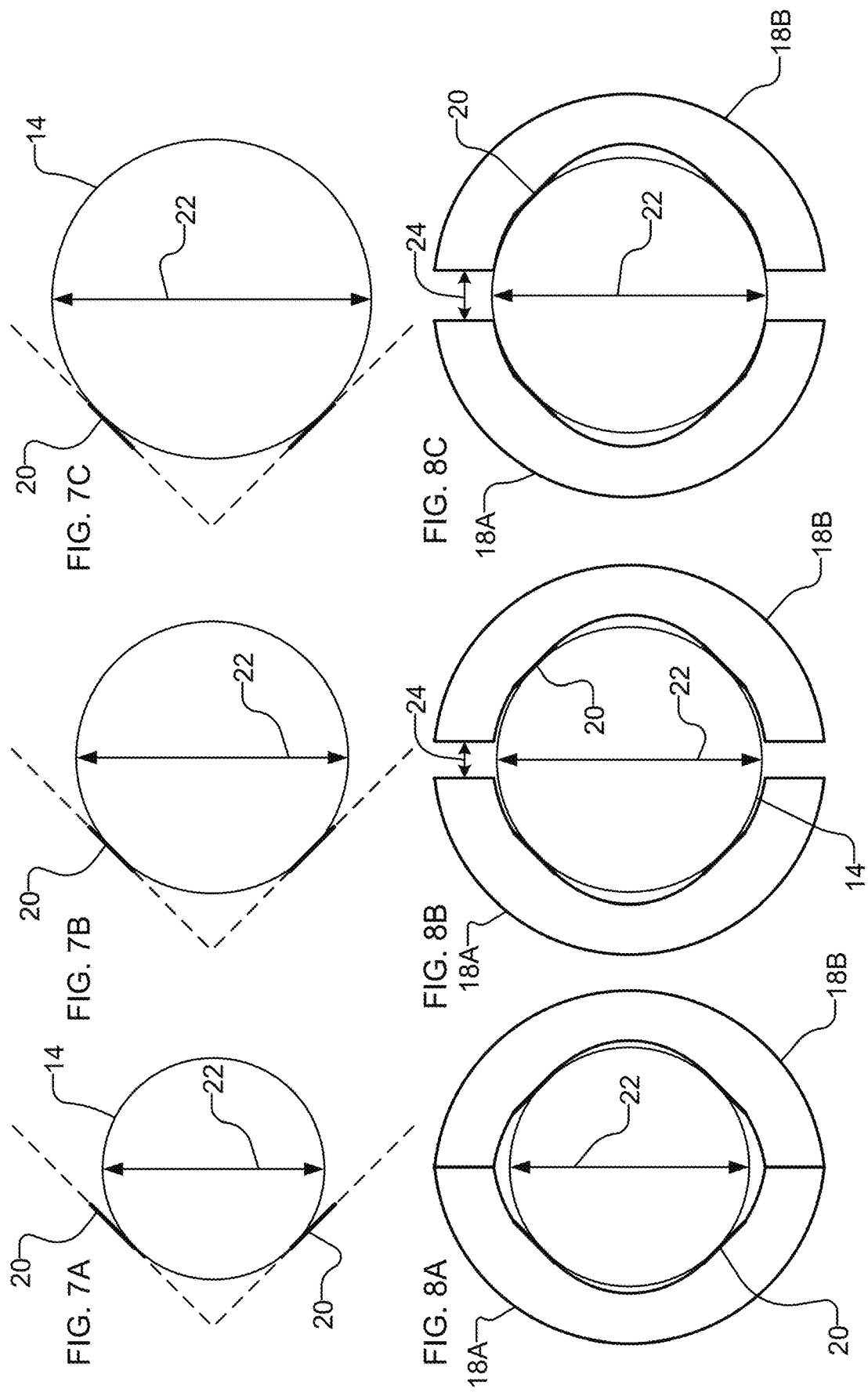

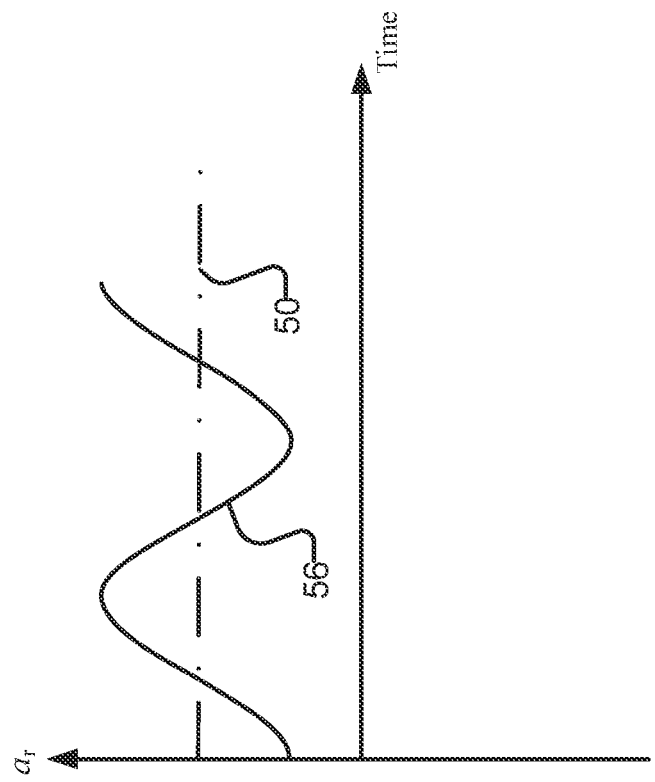
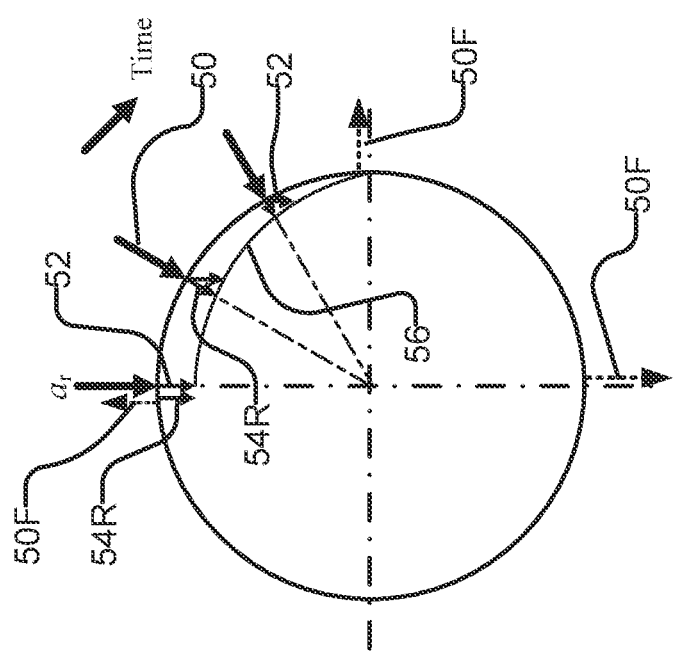
FIG. 9B
FIG. 9A

TORSIONAL VIBRATION AMPLITUDE SENSOR AND MONITOR

REFERENCE TO RELATED APPLICATIONS

This application claims the benefit under 35 U.S.C. § 119 of U.S. Patent Application No. 62/917,105 filed 17 Nov. 2018 and entitled TORSIONAL VIBRATION AMPLITUDE SENSOR AND MONITOR which is hereby incorporated herein by reference for all purposes.

TECHNICAL FIELD

This invention relates to torsional vibration sensors for sensing vibrations in rotating machine components.

BACKGROUND

Rotating machinery may be subject to damaging vibrations due to unbalanced forces, inertial forces, and forces due to misalignment, amongst other causes. Vibrations may be translational, such as an axial (longitudinal) or radial (lateral) vibration. Vibrations may also be angular, i.e. torsional.

Torsional vibration measurements are not commonly made in general rotating machinery maintenance programs or used for rotating machinery diagnostics. One reason is that it is difficult to measure torsional vibration. However, torsional vibration is probably the most common cause of gear tooth breakage, and it has been identified as a cause of blade fatigue in steam turbines. In rotating machinery trains driven by electric motors and in generator sets, torsional vibration is often produced by variations in electromagnetic torque.

In contrast to the number of instrumentation systems that can be purchased off the shelf to measure lateral vibrations in rotating machinery, only a few systems are available commercially for torsional vibration measurement. Most either require significant modifications to the rotating machine (which may be unacceptable for reasons of safety, reliability, or expense) or have significant limitations in application or performance. Consequently, engineers requiring measurements of torsional vibration often have no recourse but to design their own systems, using commercially available subcomponents wherever possible and tailoring the performance specifications to the particular application. Examples of such systems can be found in Mruk, G. H., et al, *Hydrocarbon Processing*, 229-234, May, 1979 and Ramey, D. G., et al, *J. of Engineering for Power*, 378-374, July 1977.

The oldest and probably the most widely known method of measuring torsional vibration utilizes strain gauges bonded to the surface of a rotating shaft and oriented along the directions of principal strain. The method is accurate when properly installed and calibrated, but has some severe practical disadvantages. First, the signal must be transferred from the rotating shaft to a nonrotating frame, either by the use of slip rings or by radio telemetry. In the field, dirty brushes or radio interference can produce low signal/noise ratios. Improper applications of the strain gauges can produce signals related to shaft bending rather than torsion. The gauge bonding agent may be deteriorated by environmental conditions, such as temperature or process chemicals. If all of these problems are to be avoided, the requisite installation time for an accurate and reliable system may become prohibitive, especially in a troubleshooting situation.

Prefabricated and pre-calibrated shaft sections are commercially available with preinstalled strain gauges and slip ring assemblies, or with radio telemetry antennae installed. These devices are meant to replace some existing section of shaft, or shaft coupling, in the machine. However, retrofitting such devices into a machine often raises questions of a possible loss of machine reliability or safety. In many cases, space is not readily available for the instrumented shaft section with its couplings, slip rings, or antenna.

Verhoef, W. H., *Instrumentation Technology*, 61-66, November 1977 describes several other types of instruments for measuring torsional vibration on existing shafts. One type of instrument uses a toothed wheel and is known as a torsiograph. This instrument produces a voltage proportional to the oscillatory angular velocity of the shaft. It has the disadvantage of requiring an exposed end of the shaft for its attachment, and does not respond accurately at frequencies below 10 Hz. More recently, new instrument types have been developed: one uses a photoelectrical pick up of light reflected back from a rotating shaft having regularly spaced markers on a reflective tape: Schomerus, A., TRC-RD-1-07 May 2007; another uses a laser-Doppler optical system which measures surface speed of the rotating shaft: Polytec Inc., Irvine Calif., www.polytec.com.

It is instructive to note that two of the measurement systems described (strain gauge and angular velocity measurement) will produce radically different measurements when applied at the same shaft location. Strain gauges measure the twist in the shaft and consequently will produce a maximum signal in regions where the variation of angular velocity is at a minimum. Therefore, the selection of transducer types and location should be guided by knowledge of the torsional mode shapes, or else a sufficient number of measurement locations should be used to determine the mode shape experimentally.

In machine drive trains, sometimes the first evidence of torsional vibration can be damage or breakage of gear teeth. This is occasionally referred to as 'the silent killer'. In fact, gear damage is a common first incentive for measuring torsional vibration in rotating machinery. If gears are present, they offer an ideal source of a carrier signal for most of the measurement systems described here. FIG. 1 shows the type of carrier signal that can be produced, for example, by a magnetic transducer excited by passing gear teeth. Frequency or amplitude modulation of the signal can yield the torsional vibration characteristics, provided the frequencies of interest are much lower than the carrier wave frequency, which is typically the case.

A distinction must be made between steady-state and transient measurements. Transient measurements (when shaft speed and/or torsional vibration are changing with time) are much more difficult to make and to analyze than steady state measurements. An application where transient measurements are required is the start-up of drive trains using synchronous electric motors as the driver: Vance, J. M., et al, *J. of Mech., Trans. And Automation in Design*, 108:565-577, 1986. Such motors can produce torque pulsations of large amplitude and variable frequency during start-up that excite torsional vibration superposed onto the acceleration schedule.

There is a general desire for alternative torsional vibration measurement systems that address at least some of the deficiencies of existing approaches to measuring torsional vibration.

The foregoing examples of the related art and limitations related thereto are intended to be illustrative and not exclusive. Other limitations of the related art will become appar-

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides devices capable of measuring the angular amplitude of torsional vibrations directly. Some embodiments provide one or more of the following advantages:

accurate measurements for both steady-state and transient conditions, applicable to drive trains with or without gears;

quickly and easily installed in the field directly on a shaft; and require only a short length of exposed rotating shaft or coupling spacer for installation.

Another aspect of the invention provides a torsional vibration sensor for measuring the torsional vibration of a rotating machine element, the torsional vibration sensor comprising a support structure attachable to rotate with the rotating machine element, a first sensor array carried on the support structure, the first sensor array comprising a plurality of accelerometers, and at least one data processor configured to receive output signals from the plurality of accelerometers and to process the output signals to estimate a torsional vibration amplitude of the rotating machine element by determining a ratio $a_T/a_r$ of a first tangential acceleration $a_T$ at the sensor array and a first radial acceleration $a_r$ at the sensor array.

Some such aspects of the invention may include one or more of: the accelerometers of the first sensor array comprising a first tangential acceleration sensor oriented to measure the first tangential acceleration $a_T$ of the first sensor array and a first radial acceleration sensor oriented to measure a first radial acceleration $a_r$ of the first sensor array; the first sensor array comprises a tri-axial accelerometer; a wireless data transmitter is carried on the support structure and connected to receive and wirelessly transmit the output signals or data derived by processing the output signals to a wireless receiver of a receiving system; the receiving system comprises a display connected to display the estimated torsional vibration amplitude; the at least one data processor comprises a microprocessor carried on the support structure and configured to deliver the estimated torsional vibration amplitude to the transmitter for transmission to the receiver; the at least one data processor is configured to process the first radial acceleration signal over time to identify a radial gravitational signal, calculate a corrective signal from the radial gravitational signal, and combine the corrective signal with the first tangential acceleration.

In some such aspects of the invention a torsion vibration sensor includes one or more of: processing the first radial acceleration signal over time may comprise detecting a local maximum in the first radial acceleration signal; the corrective signal may comprise a periodic waveform and the data processor may be configured to adjust a phase of the periodic waveform based on a time corresponding to the local maximum; the processor may be configured to perform spectral analysis of time variations in the estimated torsional vibration amplitude; the receiving system may comprise a programmed mobile computing device; the receiving system may comprise a SCADA system; the SCADA system may be connected to control a rotational speed of the machine element and is configured to automatically set the rotational speed of the machine element to each of a plurality of critical speeds and, at the critical speeds, to interrogate the estimated torsional vibration amplitude; the SCADA system may be configured to determine the critical speeds by altering the rotational speed of the machine element while monitoring the estimated torsional vibration amplitude and to identify as the critical speeds, speeds at which the estimated torsional vibration amplitude spikes.

In some such aspects of the invention a torsion vibration sensor may further include one or more of: the support structure comprises a collar that is removably mountable to the machine element and the first sensor array is one or more of attached to and contained within the collar; the collar comprises an aperture dimensioned to receive the machine component, the aperture comprising an inner surface having a substantially circular cross-section and three or more contact locations on the inner diametral surface, each of the contact locations projecting radially toward a center of the aperture relative to parts of the inner surface outside of the contact locations;

In another such aspect of the invention a torsion vibration sensor may further comprise a second sensor array attached for rotation with the rotatable machine element, the second sensor array comprising a second tangential acceleration sensor measuring a second tangential acceleration $a_{T2}$ of the second sensor array and a second radial acceleration sensor measuring a second radial acceleration $a_{r2}$ of the second sensor array wherein the at least one data processor is further configured to estimate the torsional vibration amplitude from a ratio $a_{T2}/a_{r2}$ of the second tangential acceleration and the second radial acceleration.

In some such aspects of the invention, a torsion vibration sensor may include one or more of: the at least one data processor is configured to combine output signals from the first and second sensor arrays to determine a gravity component of the output signals and to cancel the gravity component from the output signals; a battery is carried on the support structure and is connected to provide power to the first sensor array wherein the first sensor array is configured to harvest energy and to deliver the harvested energy to charge the battery.

Some aspects of the invention provide a method for measuring torsional vibrations in a rotating machine element, the method comprising: measuring a tangential acceleration signal indicative of a tangential acceleration at a location on the machine element; measuring a radial acceleration signal indicative of a radial acceleration at the location on the machine element; and determining a ratio $a_T/a_r$ of the tangential acceleration signal and the radial acceleration signal.

In some such aspects of the invention the method may comprise one or more of: determining the ratio $a_T/a_r$ of the tangential acceleration signal and the radial acceleration signal is performed by a processor attached to and rotating together with the rotating machine element; transmitting the ratio $a_T/a_r$ to a receiving system located away from the rotating machine element; processing a time series of the ratio $a_T/a_r$ of the tangential acceleration signal and the radial acceleration signal to obtain a frequency spectrum of the ratio and generating and displaying a plot showing the frequency spectrum; generating and displaying a plot showing the ratio $a_T/a_r$ of the tangential acceleration signal and the radial acceleration signal as a function of time.

In a further aspect of the invention there is provided an apparatus for measuring angular (torsional) vibration of a rotating shaft, the apparatus comprising a rotating unit fastened to the rotating shaft, the rotating unit comprising a first sensing element and a first wireless signal transmitter configured to transmit a signal from the first sensing element a stationary unit situated separately from the rotating shaft, the stationary unit comprising a wireless signal receiver configured to receive the signal from the transmitter and a signal processor connected to the wireless signal receiver and configured to process the signal to produce and print, display or store an angular (torsional) measurement.

In some such aspects of the invention the apparatus may include one or more of: the first sensing element is an acceleration measuring sensor; the acceleration measuring sensor is a tri-axial accelerometer, the tri-axial accelerometer comprising three accelerometers arranged in a mutually perpendicular array; the tri-axial accelerometer comprises an axial sensor, a radial sensor, and a tangential sensor, and wherein the axial sensor detects axial vibrations, the radial sensor detects phenomena indicative of average rotation speed, and the tangential sensor detects information used to generate the desired angular (torsional) measurement; acceleration data outputs of the tri-axial accelerometer are converted to a digital signal in an analog-to-digital convertor and sampling rates and sampling duration are determined based on rotational speeds and frequencies of the rotating shaft; the rotating portion comprises a collar, wherein the first sensing element and first wireless signal transmitter are mounted on the collar, the collar being split at mid plane into two parts to allow fastening to the rotating shaft.

In further such aspects of the invention the apparatus may include one or more of: the first sensing element and first wireless signal transmitter are mounted on the first part of the collar and the rotating portion comprises a second sensing element and a second wireless signal transmitter, the second sensing element and second wireless signal transmitter mounted on the second part of the collar; when the collar is clamped securely on the rotating shaft the collar contacts the shaft at three or more contact locations on an inner circumference of the collar; tangential and radial acceleration signals are combined in a microprocessor attached to the rotating shaft, to form a quotient proportional to a torsional vibration amplitude; the quotient formed in the microprocessor is transmitted by Bluetooth protocol to one of a laptop computer or mobile phone equipped with software operative to cause the laptop computer or mobile phone to display the torsional vibration amplitude;

In another aspect of the invention there is provided a method for negating a portion of a tangential acceleration signal arising from gravity, the method comprising measuring a tangential acceleration signal and a radial acceleration signal, interrogating the radial acceleration signal to identify a radial gravitational signal, calculating a correcting gravitational signal from the radial gravitational signal and applying the correcting gravitational signal in the tangential acceleration signal.

In some such aspects of the invention the method may include one or more of: wherein interrogating a radial acceleration signal to identify a radial gravitational signal comprises identifying a time at which a local maximum signal occurs in a time trace of the radial acceleration signal; wherein calculating a correcting gravitational signal comprises identifying a time at which a maximum of the radial acceleration signal occurs to identify a phase relationship of the gravity component.

In a further aspect of the invention there is provided a method for measuring torsional vibrations in a rotating structure, the method comprising measuring a tangential acceleration signal associated with a tangential acceleration component at a location on the rotating structure and spaced apart from a center of rotation of the rotating structure, measuring a radial acceleration signal associated with a radial acceleration component at the location on the rotating structure and calculating the torsional vibration amplitude from the tangential acceleration signal and the radial acceleration signal.

In some such aspects of the invention, the method may further comprise: wherein calculating the torsional vibration amplitude comprises computing a ratio of the tangential acceleration signal to the radial acceleration signal; characterizing a gravitational acceleration signal component by processing one or more of a radial acceleration signal and a tangential acceleration signal, subtracting a radial component of the gravitational acceleration signal component from the radial acceleration signal, and subtracting a tangential component of the gravitational acceleration signal component from the tangential acceleration signal.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 4 is an elevation view of a housing and mounting collar according to an example embodiment of a torsional vibration sensor unit.

FIG. 5 is an isometric semi-transparent view of an example torsional vibration sensor having a single sensor array.

FIGS. 7A through 7C are elevation cross-section views of a shaft and dedicated contact locations at increasing shaft radii.

FIGS. 8A through 8C are elevation cross-sectional views of the views shown in FIGS. 7A through 7C, additionally showing mounting collars.

FIG. 9A schematically illustrates a component of a radial acceleration signal that can be associated with gravity as a shaft rotates.

FIG. 9B shows an example of a measured radial acceleration signal over time as a sensor array rotates together with a shaft.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

A torsional vibration sensor 10 comprises one or more sensor arrays 12 attached or attachable to a piece of rotating equipment, such as a shaft 14. Sensor arrays 12 each comprise sensors that are operable to detect linear accelerations at the location of the sensor array 12 as sensor array 12 rotates with shaft 14. Output signals from sensor arrays 12 are processed to obtain measures that characterize torsional vibration of shaft 14 as described herein.

The techniques described herein are applicable to shafts and other rotating equipment. The following description explains application of the present technology for characterizing torsional vibration in a "shaft". Unless explicitly stated otherwise it is to be understood that the techniques and constructions explained in the description can be applied equally to rotating equipment of types other than shafts that experience torsional vibrations.

In some embodiments torsional vibration sensor 10 comprises a "rotating unit" that comprises sensor arrays 12 and is configured to rotate together with shaft 14 and a "stationary unit" that is not intended to rotate together with shaft 14 and provides an interface by way of which the measures that characterize torsional vibration may be accessed.

Figure 1:
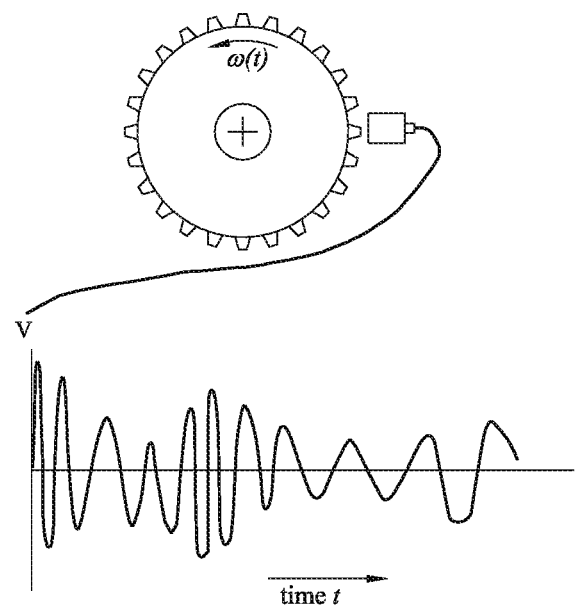
FIG. 1 shows a type of carrier signal that can be produced by a magnetic transducer excited by passing gear teeth in an example prior art torsional vibration sensor.
Figure 2:
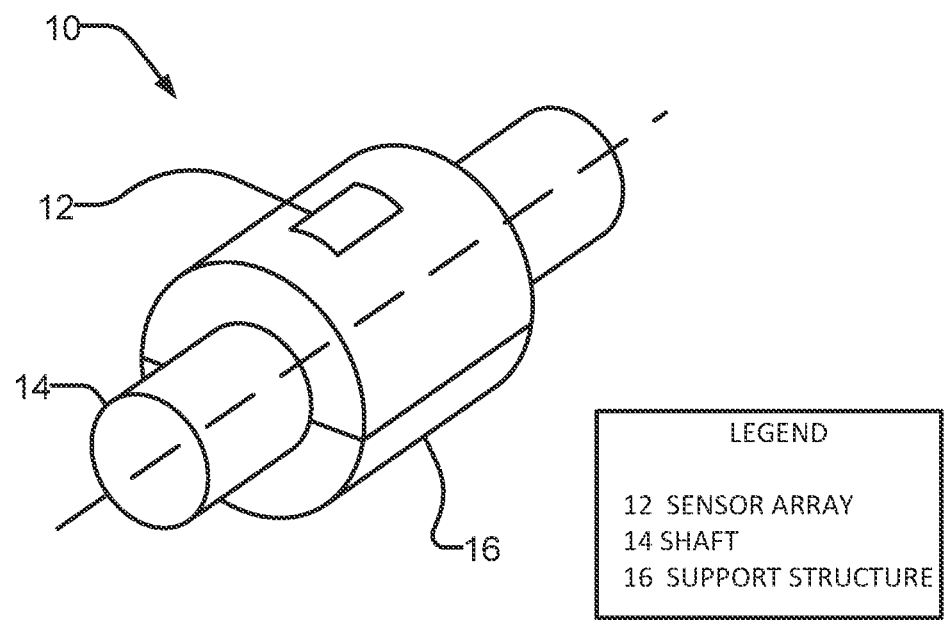
FIG. 2 is an isometric view of an example torsional vibration sensor affixed on a shaft.
Figure 3:
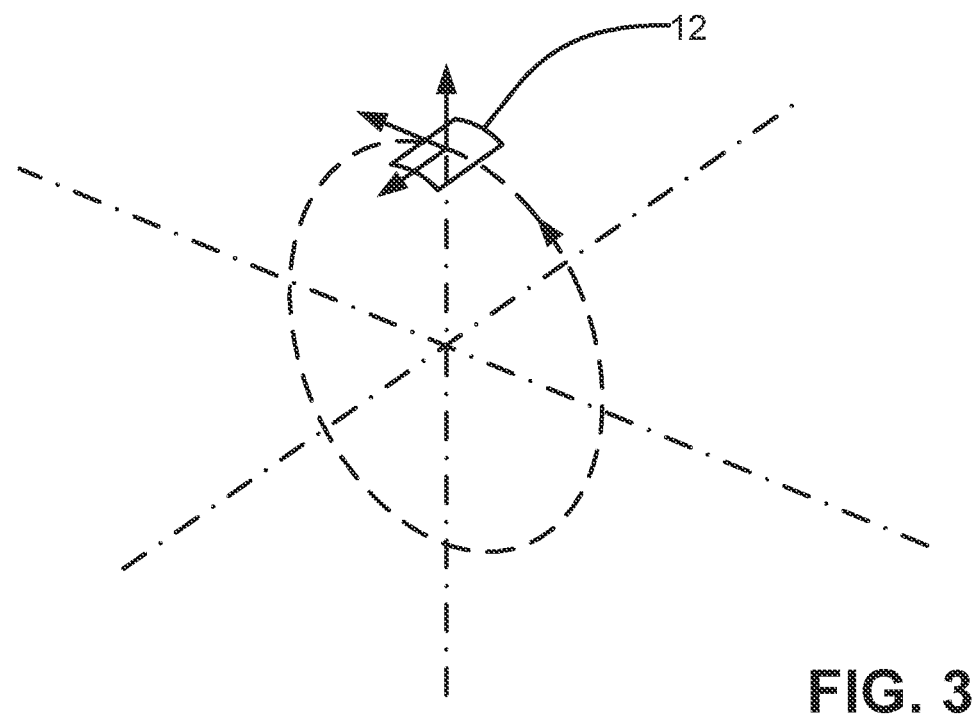
FIG. 3 is an isometric view of a sensor array showing orthogonal tangential, radial and axial axes of the sensor array relative to the rotational path of the sensor array on a rotating shaft.

FIGS. 2 and 3 illustrate how a tri-axial sensor affixed at a distance from the rotational axis of a shaft can measure linear accelerations of the sensor in space. Tri-axial sensor 12 in FIG. 3 has three orthogonal axes respectively oriented to measure tangential acceleration, radial acceleration and axial acceleration at the location of the sensor. Even if it were not so oriented, outputs of a triaxial sensor can be transformed to provide tangential, radial and axial components of the acceleration using known transformations.

While FIG. 3 shows measurement of acceleration in three orthogonal directions aligning with the radial, tangential and axial directions, it may be sufficient for the methods and apparatus described herein for a sensor array 12 to provide:

a first sensor oriented to measure a tangential component of the acceleration of sensor array 12 and a second sensor oriented to measure a radial component of the acceleration of sensor array 12; and/or two or more sensors oriented in different directions such that the tangential and radial components of acceleration at the location of sensor array 12 can each be determined from a linear combination of the accelerations measured by each of the two or more sensors.

For precise measurements of the radial and tangential components of acceleration it is preferred to provide acceleration sensors that are aligned in the tangential and radial directions. For ease of comprehension the remainder of this description treats the case where sensor array 12 comprises a tri-axial sensor in which the directions measured are orthogonal and aligned with the tangential, axial, and radial directions as shown in FIG. 3.

Sensor arrays 12 may comprise any suitable acceleration sensor technology. For example, sensor array(s) 12 may be selected from the wide range of commercially available accelerometers based on performance criteria such as measurable acceleration range, the resolution of the sensor, and the frequency response of the sensor. For example, for some applications including some marine drive trains, a suitable microelectromechanical system (MEMS) accelerometer may have a sample rate of 1-3200 Hz, frequency range 1-1600 Hz, acceleration range of ±500 g and a resolution of 0.05 g. In other applications higher frequency ranges, sampling rates and acceleration ranges may be desired. For some applications suitable sensor arrays 12 may include strain gauges, piezoelectric accelerometers, piezoresistive accelerometers, and/or capacitive accelerometers such as surface micromachined capacitive accelerometers. More than one type of sensor may be included in a given sensor array 12. In the case of a strain gauge, one or more strain gauges may be attached to shaft 14 in appropriate configurations and connected from there to other components of torsional vibration sensor 10.

In some embodiments torsional vibration sensor 10 includes two or more sensor arrays 12. Different ones of sensor arrays 12 may be at different locations relative to shaft 14. In various embodiments, a plurality of tri-axial sensors may be displaced from each other in tangential, radial, and/or axial directions. For example, two tri-axial sensors may be located on diametrically opposing sides of a shaft 14 at the same axial and radial position.

Accelerometer arrays 12 and other components of a rotating unit of torsional vibration sensor 10 can be mounted on a suitable support structure 16 that is attached to or detachably affixable to shaft 14. The support structure mechanically couples sensor array(s) 12 to shaft 14 such that torsional vibrations of shaft 14 are transmitted to sensor array(s) 12.

Support structure 16 may include a housing in or on which the one or more sensor arrays 12 are housed. While support structure 16 is attached to shaft 14, shaft 14 may be rotated. Measurements from sensor array(s) 12 may then be processed as described herein to monitor characteristics of torsional vibration of shaft 14. Support structure 16 may provide a structure for connecting sensor arrays 12 to rotating shaft 14 and may protect components of torsional vibration sensor 10 from the environment of rotating shaft 14.

A support structure may be adaptable to shafts 14 of different sizes and/or configurations. For example, in some embodiments the support structure may be adapted to clamp to any size of shaft 14 within a range of diameters. In some embodiments electronics of a rotating unit (including a sensor array 12) are packaged in a package that is configured for mounting to one of a plurality of support structures. The different support structures may be configured for attachment to different sizes and/or configurations of rotating members.

In other example embodiments the support structure may comprise a fitting, hole, flange or the like carried by rotating equipment to which a rotating unit of torsional vibration sensor 10 may be attached either on an as-needed basis or on a longer term basis.

In some embodiments, support structure 16 comprises a collar 18. A collar 18 may provide a structure allowing convenient attachment of the rotating unit of torsional vibration sensor 10 to an existing shaft 14, while providing a sufficiently rigid connection that collar 18 vibrates with shaft 14, permitting torsional vibration to be transmitted from shaft 14 into collar 18, and there to sensor array(s) 12.

Mounting Collar

To affix one or more sensor arrays 12 to a shaft 14, support structure 16 may comprise a mounting collar 18. A general view of an example mounting collar 18 is shown in FIG. 4. Mounting collar 18 is separable into parts, 18A and 18B which can be assembled to encircle an existing shaft 14.

One or more sensor arrays 12 can be located in or on collar 18. In one embodiment, a first sensor array 12A is embedded in part 18A and a second sensor array 12B is embedded in part 18B.

Figure 6A:
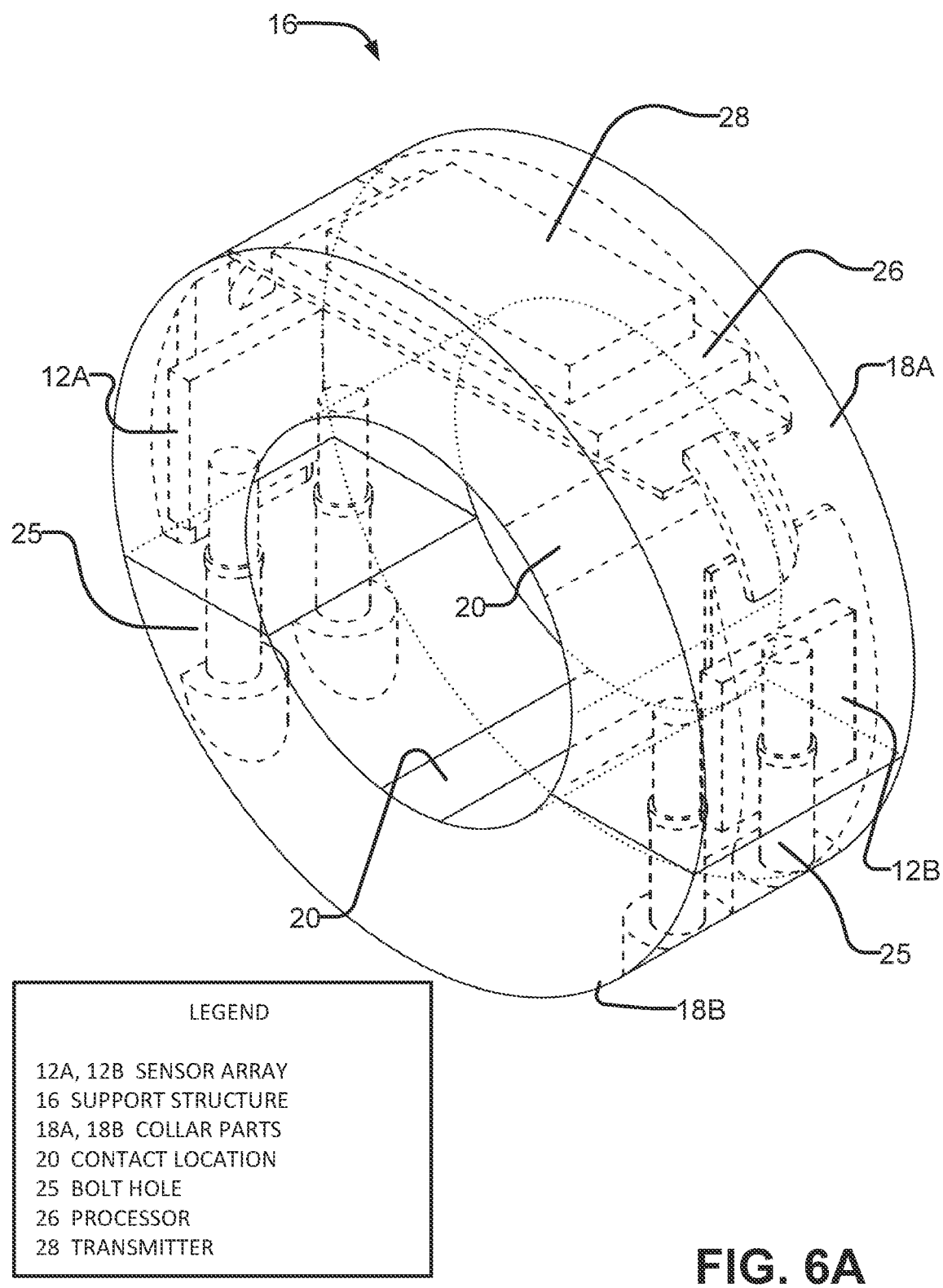
FIG. 6A is an isometric semi-transparent view of an example torsional vibration sensor having a pair of sensor arrays.
Figure 6B:
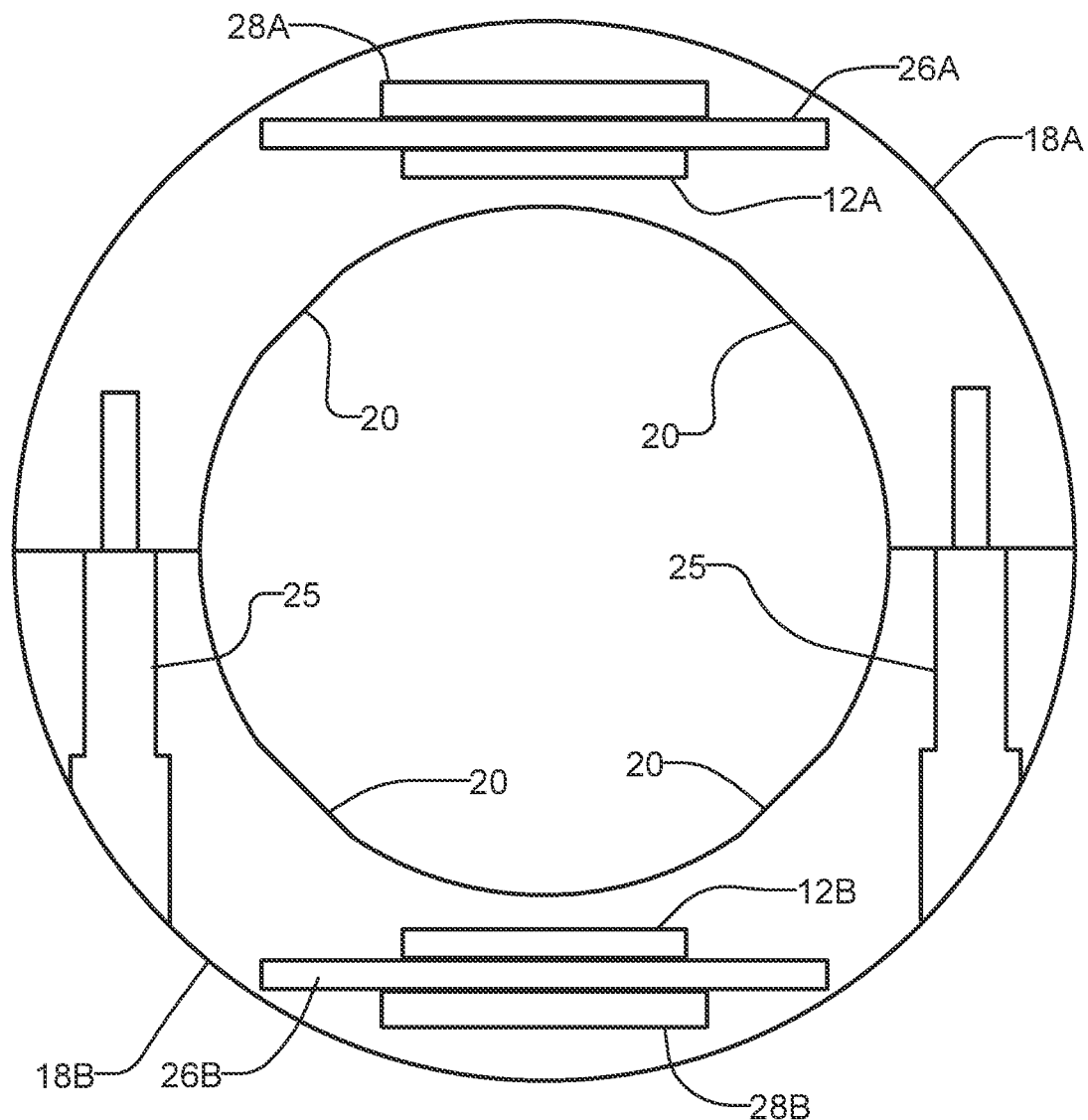
FIG. 6B is a front cross-sectional view of an example torsional vibration sensor having pairs of sensor arrays, processors and transmitters.

Mounting collar 18 may be constructed to clamp securely onto a shaft 14 and to rotate together with the shaft 14. Parts 18A and 18B may be securely clamped around a shaft in any suitable manner (e.g. by bolts, a band clamp an over-center clamping mechanism, latches on faces of parts 18A and 18B or the like). In FIGS. 5, 6A and 6B, parts 18A and 18B designed to be clamped by bolts (not shown) extending in the mid-plane of collar 18 in bolt holes 25.

Rigid affixation of collar 18 to shaft 14 may be facilitated by providing contact locations 20 distributed around the inner circumference of the collar. Contact locations 20 may allow for shaft machining tolerance, as illustrated in FIGS. 7 and 8, and described below. The inner diametrical surface may have three or more contact locations 20. Contact locations may comprise flat segments spaced around the inner circumference of the bore of collar 18, as shown, for example, in FIG. 5. More than three contact locations 20 may be provided. For example, four flat surfaces may be distributed around the inner circumference of the bore of a collar 18 as shown in FIGS. 4, 6B, 7A-7C and 8A-8C.

Contact locations 20 may comprise the same material as other parts of the inner diametrical surface of mounting collar 18, or may be comprise a different material or materials. In some embodiments properties of contact locations 20 may be chosen to increase the gripping force between contact locations 20 and shaft 14. These properties could include texture, coefficient of static friction and compressibility and may be controlled by the choice of material, shape, and structure of contact locations 20.

The flat surfaces of contact locations 20 may cause contact locations 20 to project out of the circular shape or cross-section of the inner diameter of mounting collar 18, permitting contact locations 20 to preferentially contact shaft 14 when upper and lower parts 18A, 18B are connected around shaft 14. Contact locations 20 may be configured with shapes other than flat that also make contact locations 20 preferentially contact shaft 14. For example, contact locations 20 may have reduced curvature or have negative curvature, i.e. contact locations 20 may be convex.

FIGS. 7A-7C and 8A-8C show how a diametral machining tolerance can be incorporated into the design of collar 18. A diametral gap 24 at a mid-plane of collar 18 can be sized to allow a diametral tolerance of $\pm\delta$. For example, in FIGS. 7B and 8B, if shaft 14 with four flat surfaces has a nominal diameter d and is on-size (i.e. the actual diameter of shaft 14 is d) then when parts 18A and 18B are clamped to shaft 14 gap 24 may have a spacing of $\sqrt{2}\delta$. The illustrated collar 18 can also be firmly clamped onto shaft 14 it he actual diameter of shaft 14 is slightly larger or smaller than the nominal diameter d. For example, if the actual diameter 22 of shaft 14 is d−δ, then parts 18A and 18B of collar 18 can brought together until gap 24 has a width of zero at which point shaft 14 will be gripped by collar 18. If the actual shaft diameter 22 is d+δ, as shown in FIGS. 7C and 8C, the diametral gap 24 between upper and lower parts of the collar 18 will have a width of $2\sqrt{2}\delta$. With an effective gap of $\sqrt{2}\delta$ between the upper and lower parts of the collar 18 (relative to the natural curvature of the collar), the shaft will be securely fastened when the shaft is within the stated tolerance of $\pm\delta$.

Mounting collar 18 may permit torsion vibration sensor 10 to be attached, either temporarily or for extended periods, to shaft 14. Only a short length of shaft 14 needs to be accessible for mounting collar 18.

Signal Processing

Output signals from one or more sensor arrays 12 are processed by one or more processors 26, 32 to yield values indicative of torsional vibration (for example as described herein). Data processing may be performed in a data processor 26 mounted to rotate on shaft 14 (e.g. as part of a rotating unit) and/or on a data processor 32 that is not mounted to rotate with shaft 14 (e.g. a data processor that is part of a stationary unit). Performing more data processing at the rotating unit can advantageously reduce demands on the stationary unit. This can be particularly useful where the stationary unit is provided by a mobile telephone running an application that causes the mobile telephone to provide the functionality of the stationary unit.

In embodiments which include a rotating unit and a stationary unit, a wireless data transmitter may be connected to receive output signals from each sensor array and to transmit data measured by the sensors of the sensor array(s) and/or results of processing that data at the rotating unit to a receiver separate from the rotating equipment. For example, one or more wireless data transmitters 28 may be carried with the rotating equipment. Transmitter(s) 28 may transmit data from sensor array(s) 12 to one or more receivers 30.

FIG. 5 shows an example embodiment in which output signals from a single sensor array 12 are provided to a processor 26 and the output signals or data derived from the output signals by processor 26 are provided to transmitter 28 for transmission to receiver 30.

In some embodiments that comprise plural sensor arrays 12, there may be a one-to-one correspondence between sensor arrays 12 and processors 26 and/or transmitters 28. In an example, as shown in FIG. 6B, a first sensor array 12A in part 18A of a collar 18 may be connected to a first processor 26A and a first transmitter 28A, while a second sensor array 12B in part 18B of collar 18 may be connected to a second processor 26B and a second transmitter 28B. In the alternative, two or more sensor arrays 12 may be connected to the same processor 26 and transmitter 28. In an example, as shown in FIG. 6A, two sensor arrays 12A and 12B disposed diametrically opposite each other, may be connected to provide output signals to a shared processor 26 and transmitter 28.

Processor 26 may comprise a microprocessor such as an Arduino®. Processor 26 may convert analog output signals of sensor arrays 12 to digital signals for transmission and/or processing.

Transmitter 28 may communicate with receiver 30 using any of a variety of suitable communication protocols, such as Wi-Fi, Bluetooth®, Ultra-wideband (UWB) or other telecommunications technologies.

Gravity Cancellation

A sensor array 12 experiences acceleration due to gravity as well as acceleration due to movements of the shaft 14 that it is mounted on. Some embodiments implement processing to negate the effect of the non-rotating gravitational field.

Single Sensor Array

Gravitational acceleration may be detected in outputs of either or both of radial and tangential accelerometers. For a radial accelerometer mounted to a horizontal shaft 14 rotating at a constant speed the gravitational acceleration will be a sinusoidal waveform ("gravity signal") having a period equal to the time taken for one rotation of the shaft. The accelerometer output signal may be processed to identify the gravity signal and to determine a phase or time origin of the gravity signal. This information may be applied to negate or compensate for the effect of the gravity signal. For example, a gravity compensation signal of equal magnitude but 180 degrees out of phase with the gravity signal may be added to the accelerometer output signal to cancel the gravity signal. This addition may be performed in the digital or analog domain.

Figure 10B:
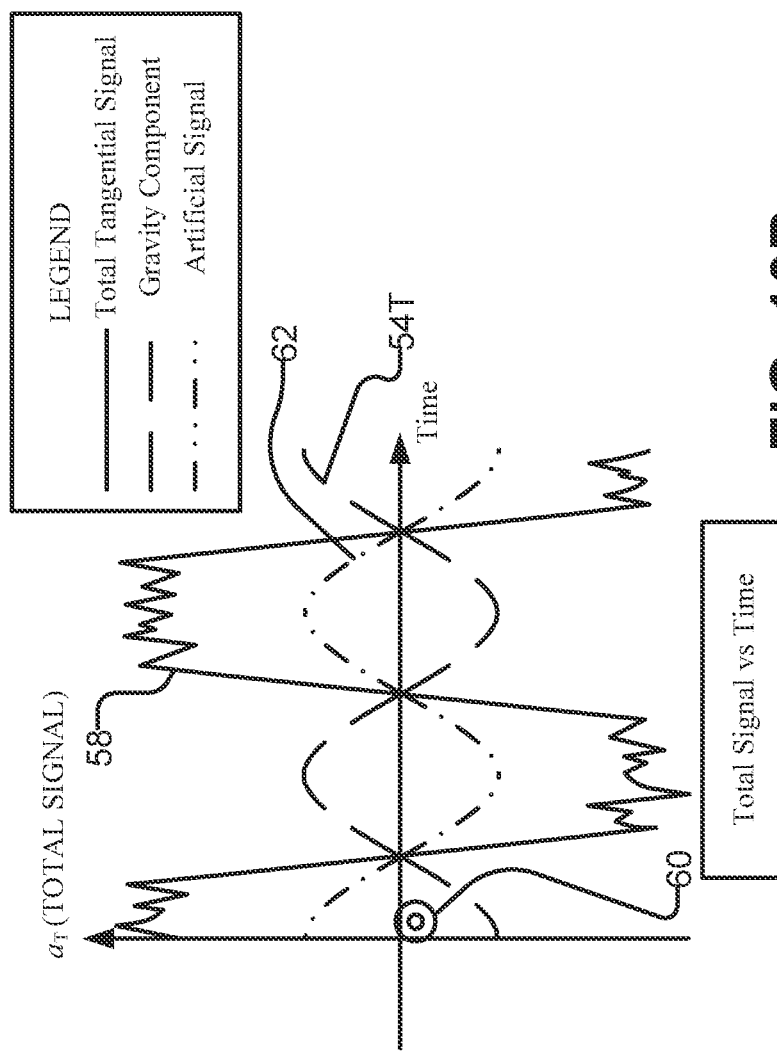
FIG. 10B shows an example of a measured tangential acceleration signal over time as a sensor array rotates together with a shaft.
Figure 10A:
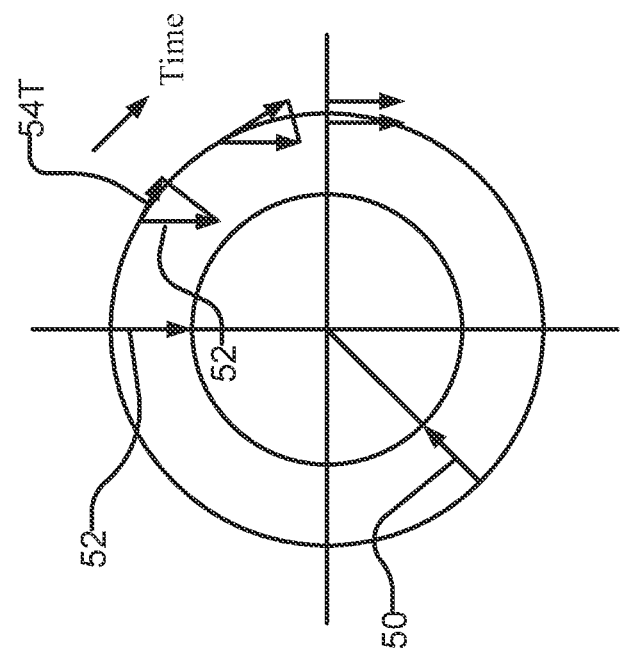
FIG. 10A schematically illustrates a component of a tangential acceleration signal that can be associated with gravity as a shaft rotates.

FIGS. 9A and 9B illustrate identification and cancellation of the gravity component in the output of a radial acceleration sensor. FIGS. 10A and 10B illustrate identification and cancellation of the gravity component in the output of a tangential acceleration sensor. FIG. 9A shows a rotating centripetal acceleration vector 50 which is always oriented in the radial direction and a non-rotating gravity acceleration vector 52 advancing with time.

Accelerometers measure proper acceleration, i.e. the acceleration of the sensor in its own instantaneous rest frame. This means that a radial acceleration sensor detects acceleration due to gravity only to the extent that this acceleration is prevented. In practice, the radial acceleration sensor measures the reactionary acceleration imposed by its fixed connection to the rotating shaft, including the centripetal acceleration and other vibrations within shaft 14. The radial acceleration sensor is affected by the reaction force applied by this connection, where $a_r = a_N + g_r$, where $a_N$ is the acceleration due to the reaction force and represents the acceleration observed by the accelerometer and $g_r$ is the component of gravity in the radial direction. Since $a_r$ is constant as the sensor travels in a circle, the accelerometer observes a smaller reaction force when the radial accelerometer is aligned with the top of shaft 14.

The conceptualization of these forces may be more intuitive when considered within the rotating reference frame of the sensor. In the rotating reference frame of the sensor, the sensor appears to be affected by a (fictitious) centrifugal force. When the radial accelerometer is aligned with the top of shaft 14 the sum 56 of the centrifugal force 50F and the radial gravitational component 54R is smaller because the vectors are antiparallel, so the acceleration signal observed by the radial accelerometer is decreased by the gravitation acceleration.

As time advances, the radial sensor is carried around shaft 14 and so the direction of gravity acceleration vector 52 changes relative to the radial direction. When the radial accelerometer has progressed ¼ of the way around shaft 14 so that the radial direction is horizontal, radial gravity component 54R has a magnitude of zero (since at this point the direction of gravitational acceleration is orthogonal to the radial direction).

When the radial sensor is aligned with the bottom of shaft 14 gravitational acceleration vector 52 is oriented in the opposite direction to centripetal acceleration vector 50. Again, since $a_r$ is constant, $a_N$ must be increased, because $g_r$ is opposite the radial direction, so a larger reaction force is required to keep the accelerometer travelling in a circle. Within the rotating reference frame, we can imagine this as the accelerometer observing the centrifugal force and gravitational acceleration being in parallel, therefore combining. Thus the acceleration sensed by the radial accelerometer is increased by the gravitational acceleration.

FIG. 9B shows an example total radial accelerometer signal 56 which is the superposition of a steady part 50 due to centripetal acceleration and a variable part due to gravitational acceleration. The gravity portion is a simple trigonometric form, and the maximum of the total signal 56 can be easily detected, and used as a time origin for the gravity component.

FIG. 10A schematically illustrates a tangential accelerometer rotating with a shaft. Similar to the radial case described above with relation to FIGS. 9A and 9B the direction of gravity acceleration vector 52 relative to the tangential direction varies with the rotational position of a tangential accelerometer. For clarity, only the gravitational contribution to the tangential acceleration is shown in FIG. 10A. Since centripetal acceleration is entirely radial the tangential accelerometer does not detect the centripetal acceleration. FIG. 10B shows the time variation of the total tangential signal 58, including the superimposed gravity component 54T.

Gravity component 54T may be cancelled by adding an artificial signal 62 which is out of phase and of equal magnitude to gravity component 54T. The timing of artificial signal 62 may be determined using information regarding the timing (phase) of the radial component 54R of the gravity signal which may, for example, be determined as described above in relation to FIGS. 9A and 9B. The phase of artificial signal 62 may be set based on the time origin 60 of the gravity signal. Addition of artificial signal 62 yields a tangential acceleration signal free of gravity effects, suitable for further processing to develop torsional velocity and torsional amplitude estimates.

In some embodiments, the time origin of the gravity component may be determined from the tangential acceleration signal by identifying the sinusoidal variation in the total tangential acceleration signal that corresponds to tangential gravitational component 54T. This may be used on its own, or in combination with and in comparison against the time origin 60 of the radial gravity component 54R as determined from the observed radial acceleration signal 56.

In some operating conditions it may be unnecessary to cancel the gravitational component in one or both of the tangential and radial acceleration signals. This may particularly be the case at higher rotational speeds and at larger torsional amplitudes. For example, at speeds greater than 1000 rpm and at typical shaft radii, the gravitational component of the radial acceleration signal may be insignificant.

In some embodiments torsional vibration senor 10 includes a control which allows gravitational cancellation to be turned ON or OFF. Some embodiments are configured to automatically turn gravitational cancellation ON or OFF depending on the magnitude of an acceleration signal being measured or the magnitude of the acceleration signal being measured relative to the gravitational component of the acceleration signal being measured.

Plural Sensor Arrays

In some embodiments, two or more sensor arrays 12 are attached to rotating machinery. For example, two sensor arrays may be disposed at the same radius and axial position but at 180° displacement around the axis of rotation, i.e. positioned oppositely through the axis of rotation. Having two or more sensor arrays facilitates alternative ways to cancel gravitational components from accelerometer output signals.

In embodiments with multiple sensors at the same radius and axial position, but different angular positions, the gravitational component of acceleration can be determined by comparison of two or more radial acceleration signals or two or more tangential acceleration signals. As an example, consider two sensor arrays mounted to a horizontal rotating shaft with an angular separation of $\varphi$, which respectively measure a first radial acceleration $a_{r1}$ and a second radial acceleration $a_{r2}$. Then each sensor array measures the combination of the centripetal acceleration of the shaft $a_r$, and the acceleration due to the radial component of gravity at that sensor array, which varies cyclically as the sensor arrays rotate together with the shaft:

$$a_{r1} - a_{r2} = (a_r + g\ \sin(\omega t)) - (a_r + g\ \sin(\omega t + \varphi)) \quad (1)$$

$$a_{r1} - a_{r2} = g(\sin(\omega t) - \sin(\omega t + \varphi)) = -2g\ \sin\frac{\varphi}{2}\cos\left(\omega t + \frac{\varphi}{2}\right) \quad (2)$$

In the case that $\varphi=180°$, i.e. where two sensor arrays are disposed diametrically opposite each other around the shaft, then this simplifies to:

$$a_{r1} - a_{r2} = 2g\ \sin(\omega t) \quad (3)$$

From either equation (2) or equation (3), the gravity component of each signal can be isolated and removed from the signal to facilitate further processing.

Torsional Amplitude

A signal processing sequence can be used to calculate a signal directly proportional to the torsional angular amplitude from the quotient of the tangential acceleration signal $a_T$ and the radial acceleration signal $a_r$. This calculation can remove the need to have an independent measurement of the steady rotational speed and may also obviate the need for a precise measurement of the radius from the axis of rotation to the sensor array.

In the following equations, $\omega_E$ is the rotational speed of a shaft expressed in radians per second, n is the order of the vibration, $\theta(t)$ is the torsional amplitude of the nth order vibration, $\in$ is the phase, and $\theta_n$ is the amplitude of the 'nth' order vibration, $\omega(t)$ is the overall angular velocity, $a_r$ is the radial acceleration, and $a_T$ is the tangential acceleration.

Considering a sensor array at a radius r from the axis of rotation and neglecting gravity, the amplitude of torsional vibration observed by that sensor array can be represented as:

$$\theta(t) = \theta_n \sin(n\omega_E t + \in_n) \quad (4)$$

For rotational speed that is constant or that changes slowly enough, we can represent the overall angular velocity of the sensor array as:

$$\omega(t) = \omega_E + \frac{d\theta}{dt} = \omega_E - \theta_n(n\omega_E)\cos(n\omega_E t + \in_n) \quad (5)$$

Rotational kinematics provides that $a_r = \omega^2 r$, so:

$$a_r = \omega^2 r = \omega_E^2 r (1 + \theta_n n\ \cos(n\omega_E t + \in_n))^2 \quad (6)$$

For convenience, define $$\Delta := \theta_n n\ \cos(n\omega_E t + \in_n) \quad (7)$$

Therefore, $a_r$ can be expressed as:

$$a_r = \omega_E^2 r(1 + 2\Delta + \Delta^2) \quad (8)$$

and $$a_T = r\frac{d\omega(t)}{dt} = -\theta_n n^2 \omega_E^2 r\ \sin(n\omega_E t + \in_n) \quad (9)$$

Therefore:

$$\frac{a_T}{a_r} = \frac{-\theta_n n^2 \omega_E^2 r\ \sin(n\omega_E t + \in_n)}{\omega_E^2 r(1 + 2\Delta + \Delta^2)} \quad (10)$$

For values of $\Delta \approx 0$, substituting the Taylor series gives:

$$(\pm)\frac{a_T}{a_r} = (\pm)\theta_n n^2\ \sin(n\omega_E t + \in_n)(1 - 2\Delta + O(\Delta^2)) \quad (11)$$

Consequently, the ratio of the tangential acceleration and the radial acceleration is directly proportional to the amplitude of the nth order torsional vibration. The equations are given for a single 'nth' order of vibration. This approximation may be especially effective where a single order contributes substantially all of the torsional vibration in the system. This may, for example, be especially appropriate at critical rotational speeds of the shaft. In some embodiments this calculation is advantageous in that it can provide the amplitude of torsional vibrations without requiring measurement or knowledge of the radius of the shaft or an independent measurement of the angular velocity of the shaft.

Other measurements may also be made from the tangential and radial accelerations. The radial acceleration signal can also be used to infer the average rotational speed of the shaft. Located at a fixed radial distance from the shaft centerline, the average speed of the rotating shaft can be calculated as:

$$a_r = \omega^2 r \quad (12)$$

If the radial distance of the radial accelerometer is known, then the average rotational speed of the shaft can be determined.

The tangential portion of the sensor detects the variable angular acceleration present as the shaft experiences torsional vibrations. In some embodiments, the total tangential acceleration measurement can be integrated to yield the angular velocity, and further integrated to yield the time-variation of the angle the shaft twists due to torsional vibration.

Alternatively, angular velocity of the shaft may also be identified from the sinusoidal period of the gravitational component of the tangential or radial accelerometer signals. Once the gravitational component has been identified it can be fitted to the equation $g\ \sin(\omega_E t + \in)$ where $\omega_E$ is the angular velocity of the shaft.

In some embodiments, two or more sensor arrays can be mounted to a shaft at positions that are axially spaced apart along the shaft. Two axially displaced sensor arrays can be used to infer the steady torque being transmitted in the shaft, which can then be used to make an on-line estimate of the running power being transmitted in the shaft. Inferring the steady torque requires the angle of twist between the two sensor arrays, which can be calculated either from the accumulated torsional vibrations calculated from the ratio $$\frac{a_T}{a_r}$$

or from the twice integrated tangential acceleration measurement, as calculated for each sensor array. Using the angle of twist in combination with the axial length between the two sensor arrays, one can calculate the applied torque, up to a scaling factor equal to the torsional rigidity of that section of the shaft $w_T=J_T G$, where $J_T$ is the torsion constant for that section, and G is the shear modulus.

Sensor arrays 12 may be tri-axial accelerometers. In such cases, sensor arrays 12 may also measure axial acceleration $a_X$. An axial acceleration signal may be forwarded by the system without further calculations.

In some embodiments, strain gauges (not shown) may be attached to shaft 14. In such embodiments, strain gauge circuit outputs may connect to processor 26 and transmitter 28 in support structure 16 to provide further torsional twist data.

Example Hardware

Figure 11A:
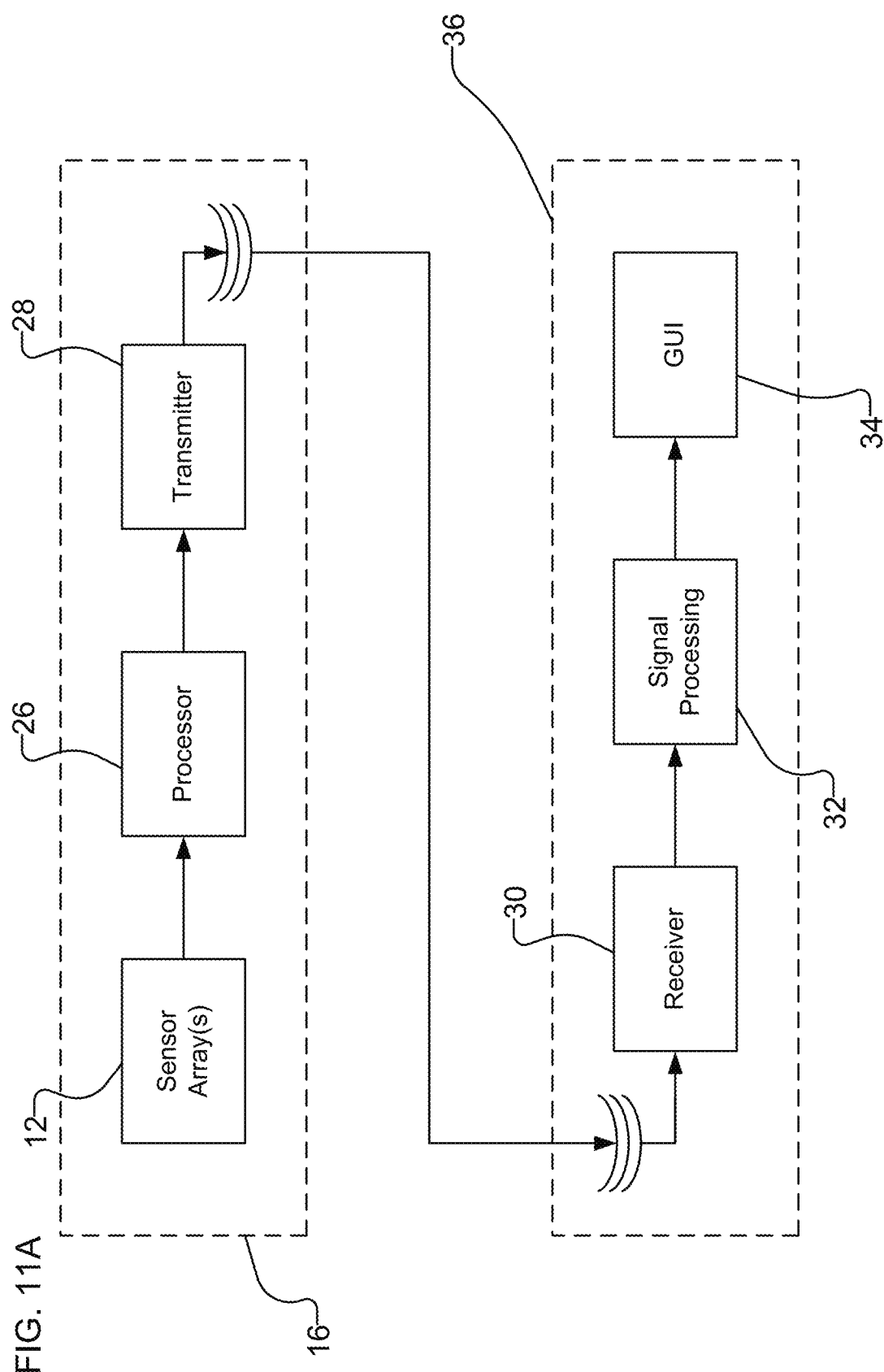
FIG. 11A is a signal processing and receiving logic diagram for an example torsional vibration sensor.

FIG. 11A is a signal processing logic diagram for an example embodiment. Sensor array(s) 12 provide output signals to processor(s) 26. The output signals are digitised by processor 26 or a separate analog to digital converter (ADC).

The signal sampling rate and sample size (resolution) can be set to accommodate the frequency range anticipated. For many torsional vibration monitoring applications the torsional vibrations of interest have frequencies of a few Hz to a few hundred Hz. In such applications signal sampling rates typically do not need to exceed a few kHz which is readily achievable.

In some embodiments, the sampling rate is controlled by data processor(s) 26 and the sampling rate is set automatically by data processor(s) 26 or 32 based on a speed of rotation of shaft 14. The speed of rotation of shaft 14 may be determined, for example, in any of the ways described herein.

In one arrangement, digital output signals from sensor arrays 12 are sent to a processor 26 which decodes the signals using a SPI (serial peripheral interface) protocol (one-, two- and three-axis accelerometers that include a SPI interface for outputting digital output signals are commercially available, sensor array(s) 12 may include such accelerometers). Processor 26 then further encodes the signals using UART (universal asynchronous receiver-transmitter) protocol, with suitable data formatting and transmission speeds and provides the signals to transmitter 28. Transmitter 28 receives, decodes and retransmits the signal using Bluetooth or another suitable wireless transmission protocol. Sampling rates and sampling durations may be determined based on rotational speeds and frequencies of the rotating shaft.

Figure 11B:
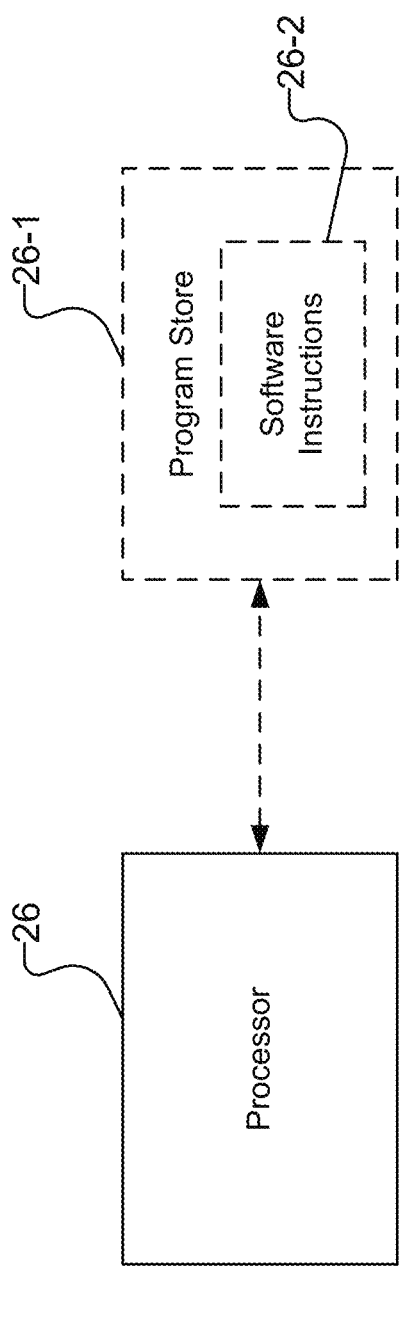
FIG. 11B is a schematic diagram of a processor connected to a program store.
Figure 11C:
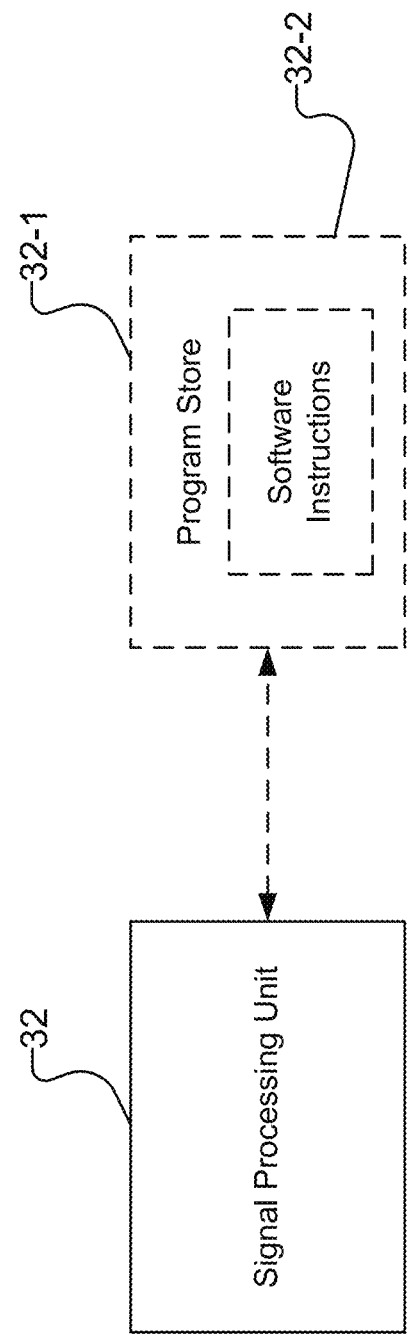
FIG. 11C is a schematic diagram of a signal processing unit connected to a program store.

As illustrated in FIG. 11B, processor 26 may have access to a program store 26-1 containing software instructions 26-2 that instruct processor 26 to perform one or more of the processes described herein, such as decoding signals using a SPI protocol and encoding the signals using UART protocol. Program store 26-1 may be internal to or connected to processor 26, or may be accessible to processor 26 by suitable telecommunications means.

A receiver 30 receives and decodes the Bluetooth protocol signal and re-encodes the signal using UART protocol, suitable for handling by receiving end signal processing unit 32.

Signal processing unit 32 may comprise one or more data processors and may have access to a program store 32-1 containing software instructions 32-2 that instruct signal processing unit 32 to perform one or more of the above processes, as illustrated in FIG. 11O. Similar to program store 26-1, program store 32-1 may be internal to or connected to signal processing unit 32, or may be accessible to signal processing unit 32-1 by suitable telecommunications means. Software instructions 32-2 may instruct signal processing unit 32 to done or any combination of or all of:
  perform a gravity cancelling process as described above (if necessary).
  calculate the quotient $(a_T/a_R)$ of the tangential and radial acceleration signals, which is directly proportional to the desired torsional vibration amplitude $\theta_n$.
  numerically integrate the tangential (torsional) acceleration signal to derive the torsional velocity, and optionally perform a second integration step to obtain a measure of torsional amplitude (twist) of the shaft 14.
  perform spectral decomposition e.g. using FFT (fast Fourier transform) methods.
  perform any other processing as described herein.

GUI (graphical user interface) 34 displays computed results which may be recorded, stored or printed for inspection.

Figure 12:
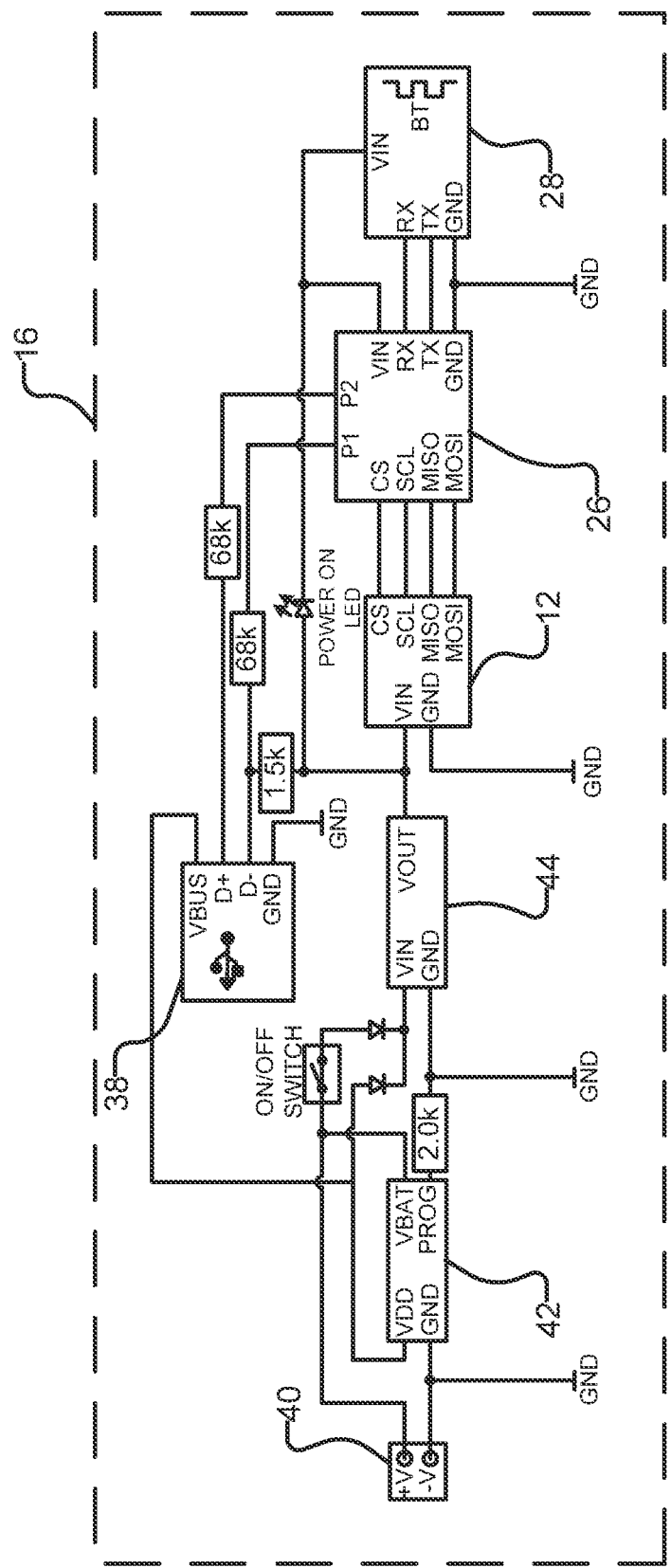
FIG. 12 is a circuit diagram for components within a housing of an example torsional vibration sensor.

FIG. 12 is a circuit diagram for an example circuit that may be mounted (e.g. in a housing of a support structure 16) to rotate with a shaft 14. A USB input 38 connects to sensor array 12, processor 26 and transmitter 28 through USB data input and output lines. USB input 38 may also provide power to the system, including to battery 40 through charger 42. The power output of battery 40 and charger 42 is regulated through voltage regulator 44 to sensor array 12, processor 26 and transmitter 28.

On board processor 26 is optionally configured to perform one or more of:
  processing output signals from one or more sensor arrays 12 to compute a quotient $(a_T/a_R)$ of tangential acceleration and radial acceleration.
  cancellation of gravitational acceleration as described herein (if necessary).
  other computations as described herein.

Performing more processing on processor 26 that rotates with shaft 14 can reduce both the amount of data to be transmitted to receiver 30 and the amount of processing required to be done at signal processing unit 32. For example, if the quotient $(a_T/a_r)$ of tangential acceleration and radial acceleration is the only set of results being calculated the processing requirements at the receiving end of the signal may be made minimal. The calculated quotient may be displayed on the receiving device and/or processed further (e.g. for spectral analysis of the amplitude θn). In some embodiments amplitude θn is plotted as a function of time and/or plotted as a function of frequency.

In some embodiments, receiving end signal processing unit 32 includes or has access to a data store (e.g. a memory) for storing historic measurements. Such embodiments may provide graphic displays that illustrate how torsional vibration at one or more speeds has evolved in time and/or displays that compare current and previous measurements of torsional vibration.

In some embodiments, the receiving system 36 may be part of a Supervisory Control and Data Acquisition (SCADA) system. If the SCADA system is connected to control the speed of rotation of shaft 14, the SCADA system may optionally be configured to perform methods as described above automatically.

In other embodiments, receiving system 36 could be any of a variety of suitable devices such as a programmed portable computer, mobile phone, tablet or test instrument.

Figure 13:
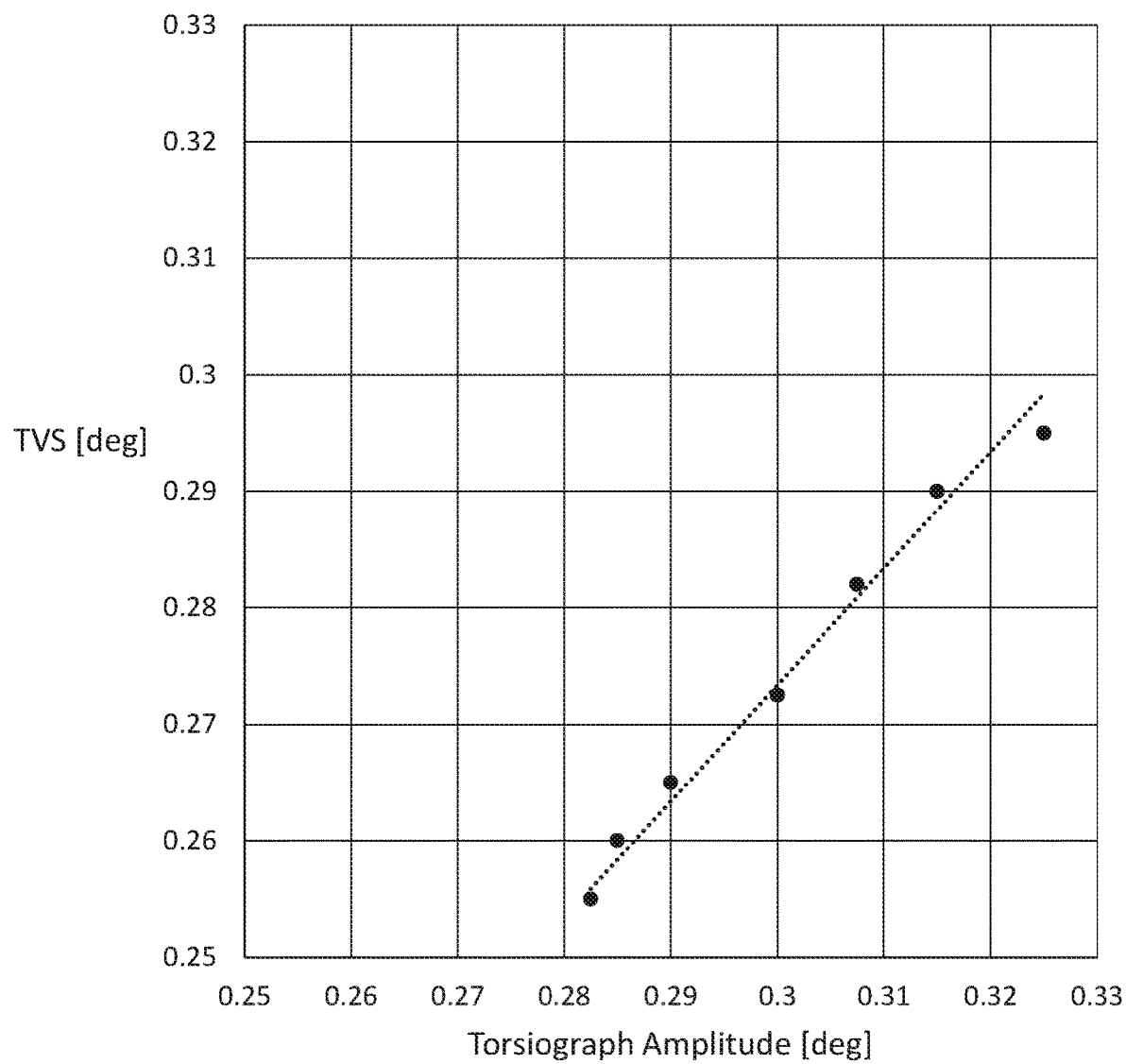
FIG. 13 is a graph that compares an output of a prototype torsional vibration sensor according to the invention to a traditional seismic-type torsiograph.

Tests were run using a prototype attached directly to the shaft of a torsional test rig. Torsional amplitudes were measured with a traditional seismic-type torsiograph and concurrently with the prototype torsional sensor device. The results of these tests are shown in FIG. 13.

Example Application Methods

In one method according to the invention, a rotating unit is attached to a shaft 14 and shaft 14 is driven to rotate at each of a set of different speeds. If critical speeds of the shaft and system are known, then the shaft can be run up to each of the critical speeds in turn. If the critical speeds are not known in advance the shaft can be driven to rotate at a speed that is gradually changed to cover a desired range of operating speeds while monitoring a level of torsional vibrations (e.g. while monitoring the quotient ($a_T/a_R$) of tangential acceleration and radial acceleration). Spikes (i.e. sharp increases) in the torsional vibration level correspond to critical speeds of the system.

At each critical speed, the torsional vibration sensor can be interrogated to obtain measurements of the amplitude of the torsional vibrations (e.g. using the ratio of the tangential acceleration to the radial acceleration and/or twice integrating the tangential acceleration, each as described above). By interrogating the torsional vibrations at each critical speed, the user may identify the health of the system and identify the scale of torsional vibrations at the operating speeds of the shaft.

In some embodiments, a sampling duration at each critical speed may be determined based on frequencies in the frequency spectrum of estimated torsional vibration. For example, sampling may be continued for a duration that is at least a desired multiple of the period of the lowest frequency observed in the torsional vibration frequency spectrum (e.g. frequency spectrum of θn) at the critical speed.

In some embodiments, interrogating the torsional vibrations at a critical speed may involve holding the operating steady while the critical speed is being interrogated. In other embodiments, the critical speed may be interrogated while the operating speed is slowly ramped up or down. In such embodiments, the rate at which the operating speed is ramped up or down may be limited by the frequency response of the data acquisition.

These methods may be used diagnostically, for example as part of regular maintenance or as a step in commissioning new or modified rotating equipment. The methods may also be used as part of continuous or periodic monitoring during normal operation of the rotating equipment. The methods may also be applied to design and test the efficacy of modifications made to reduce torsional vibrations.

While a number of exemplary aspects and embodiments have been discussed above, those of skill in the art will recognize certain modifications, permutations, additions and sub-combinations thereof. Without limitation, these include:

In some embodiments, the sensor array comprises a suitably arranged set of strain gauges.

In addition or in the alternative to transmitting data from equipment that rotates with shaft 14 to equipment that does not rotate with shaft 14, the equipment that rotates with shaft 14 may include a data logger that records output signals from one or more sensor arrays 12 and/or values computed by processing the output signals in processor 26.

In some embodiments power to operate equipment that rotates with a shaft 14 is generated by an on-board energy harvesting system. For example, accelerometers may generate small amounts of electrical power in response to vibrations and other motions of shaft 14. This electrical power may be stored (e.g. by charging a battery or capacitor) and used to power the described equipment that rotates with shaft 14. An on-board energy harvesting system may permit a torsion vibration sensor to be used for extended periods of time or even indefinitely without intervention to replace or recharging a battery.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a torsional vibration measurement apparatus as described herein may implement methods as described herein by executing software instructions in a program memory accessible to the processors.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

Where a component (e.g. a software module, processor, accelerometer, support structure, bolt, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments" or "in some implementations". Such features are not mandatory and may not be present in all embodiments or implementations. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" or "some implementations" possess feature A and "some embodiments" or "some implementations" possess feature B should be interpreted as an express indication that the inventors also contemplate embodiments and implementations which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A torsional vibration sensor for measuring the torsional vibration of a rotating machine element, the torsional vibration sensor comprising:
    a support structure attachable to rotate with the rotating machine element,
    a first sensor array carried on the support structure, the first sensor array comprising a plurality of accelerometers, and
    at least one data processor configured to receive output signals from the plurality of accelerometers and to process the output signals to estimate a torsional vibration amplitude of the rotating machine element by determining a ratio $$\frac{a_T}{a_r}$$

or a first tangential acceleration $a_T$ at the first sensor array and a first radial acceleration $a_r$ at the first sensor array.

2. The torsional vibration sensor according to claim 1 wherein the accelerometers of the first sensor array comprise a first tangential acceleration sensor oriented to measure the first tangential acceleration $a_T$ of the first sensor array and a first radial acceleration sensor oriented to measure a first radial acceleration $a_r$ of the first sensor array.

3. The torsional vibration sensor according to claim 2 wherein the first sensor array comprises a tri-axial accelerometer.

4. The torsional vibration sensor according to claim 2 further comprising a wireless data transmitter carried on the support structure and connected to receive and wirelessly transmit the output signals or data derived by processing the output signals to a wireless receiver of a receiving system.

5. The torsional vibration sensor according to claim 4, wherein the receiving system comprises a display connected to display the estimated torsional vibration amplitude.

6. The torsional vibration sensor according to claim 5 wherein the at least one data processor comprises a microprocessor carried on the support structure and configured to deliver the estimated torsional vibration amplitude to the transmitter for transmission to the receiver.

7. The torsional vibration sensor according to claim 5, wherein the receiving system comprises a programmed mobile computing device.

8. The torsional vibration sensor according to claim 5, wherein the receiving system comprises a SCADA system.

9. The torsional vibration sensor according to claim 8, wherein the SCADA system is connected to control a rotational speed of the machine element and is configured to automatically set the rotational speed of the machine element to each of a plurality of critical speeds and, at the critical speeds, to interrogate the estimated torsional vibration amplitude.

10. The torsional vibration sensor according to claim 8, wherein the SCADA system is configured to determine the critical speeds by altering the rotational speed of the machine element while monitoring the estimated torsional vibration amplitude and to identify as the critical speeds, speeds at which the estimated torsional vibration amplitude spikes.

11. The torsional vibration sensor according to claim 1 wherein the at least one data processor is configured to:
 process the first radial acceleration signal over time to identify a radial gravitational signal;
 calculate a corrective signal from the radial gravitational signal; and
 combine the corrective signal with the first tangential acceleration.

12. The torsional vibration sensor according to claim 11 wherein processing the first radial acceleration signal over time comprises detecting a local maximum in the first radial acceleration signal.

13. The torsional vibration sensor according to claim 12 wherein the corrective signal comprises a periodic waveform and the data processor is configured to adjust a phase of the periodic waveform based on a time corresponding to the local maximum.

14. The torsional vibration sensor according to claim 1 wherein the processor is configured to perform spectral analysis of time variations in the estimated torsional vibration amplitude.

15. The torsional vibration sensor according to claim 1, wherein the support structure comprises a collar that is removably mountable to the machine element and the first sensor array is one or more of attached to and contained within the collar.

16. The torsional vibration sensor according to claim 15, wherein the collar comprises:
 an aperture dimensioned to receive the machine component, the aperture comprising an inner surface having a substantially circular cross-section;
 three or more contact locations on the inner diametral surface, each of the contact locations projecting radially toward a center of the aperture relative to parts of the inner surface outside of the contact locations.

17. The torsional vibration sensor according to claim 1, further comprising:
 a second sensor array attached for rotation with the rotatable machine element, the second sensor array comprising:
 a second tangential acceleration sensor measuring a second tangential acceleration $a_{T2}$ of the second sensor array; and
 a second radial acceleration sensor measuring a second radial acceleration $a_{r2}$ of the second sensor array;
 wherein the at least one data processor is further configured to estimate the torsional vibration amplitude from a ratio $$\frac{a_{T2}}{a_{r2}}$$

of the second tangential acceleration and the second radial acceleration.

18. The torsional vibration sensor according to claim 17 wherein the at least one data processor is configured to combine output signals from the first and second sensor arrays to determine a gravity component of the output signals and to cancel the gravity component from the output signals.

19. The torsional vibration sensor according to claim 1 comprising a battery carried on the support structure and connected to provide power to the first sensor array wherein the first sensor array is configured to harvest energy and to deliver the harvested energy to charge the battery.

20. A method for measuring torsional vibrations in a rotating machine element, the method comprising:
 measuring a tangential acceleration signal indicative of a tangential acceleration at a location on the machine element;
 measuring a radial acceleration signal indicative of a radial acceleration at the location on the machine element;
 determining a ratio $$\frac{a_T}{a_r}$$

of the tangential acceleration signal and the radial acceleration signal; and
 estimating a torsional vibration amplitude of the rotating machine element by the determined ratio $$\frac{a_T}{a_r}.$$

21. The method of claim 20 wherein determining the ratio $$\frac{a_T}{a_r}$$

of the tangential acceleration signal and the radial acceleration signal is performed by a processor attached to and rotating together with the rotating machine element.

22. The method of claim 21 further comprising transmitting the ratio $$\frac{a_T}{a_r}$$

to a receiving system located away from the rotating machine element.

23. The method of claim 20 comprising processing a time series of the ratio $$\frac{a_T}{a_r}$$

of the tangential acceleration signal and the radial acceleration signal to obtain a frequency spectrum of the ratio and generating and displaying a plot showing the frequency spectrum.

24. The method of claim 20 comprising generating and displaying a plot showing the ratio $$\frac{a_T}{a_r}$$

of the tangential acceleration signal and the radial acceleration signal as a function of time.

* * * * *